United States Patent
Koh

(10) Patent No.: US 10,142,679 B2
(45) Date of Patent: Nov. 27, 2018

(54) CONTENT PROCESSING APPARATUS, CONTENT PROCESSING METHOD THEREOF, SERVER INFORMATION PROVIDING METHOD OF SERVER AND INFORMATION PROVIDING SYSTEM

(71) Applicant: SAMSUNG ELECTRONICS CO., LTD., Suwon-si, Gyeonggi-do (KR)

(72) Inventor: Kwang-hyun Koh, Seoul (KR)

(73) Assignee: SAMSUNG ELECTRONICS CO., LTD., Suwon-si, Gyeonggi-do (KR)

( * ) Notice: Subject to any disclaimer, the term of this patent is extended or adjusted under 35 U.S.C. 154(b) by 0 days.

(21) Appl. No.: 15/371,548

(22) Filed: Dec. 7, 2016

(65) Prior Publication Data

US 2017/0171609 A1    Jun. 15, 2017

(30) Foreign Application Priority Data

Dec. 10, 2015    (KR) ........................ 10-2015-0176288

(51) Int. Cl.
     *H04H 60/32*      (2008.01)
     *H04N 21/44*      (2011.01)
     (Continued)

(52) U.S. Cl.
     CPC ... *H04N 21/44008* (2013.01); *G06K 9/00744* (2013.01); *H04N 21/251* (2013.01);
     (Continued)

(58) Field of Classification Search
CPC combination set(s) only.
See application file for complete search history.

(56) References Cited

U.S. PATENT DOCUMENTS 7,500,007 B2    3/2009    Ikezoye et al.
2012/0274850 A1*   11/2012   Hawkins ............ H04N 21/4307
                                                    348/515

(Continued)

FOREIGN PATENT DOCUMENTS

KR    10-2014-0067792      6/2014
KR    10-2014-0094629      7/2014

(Continued)

OTHER PUBLICATIONS

Search Report and Written Opinion dated Feb. 15, 2017 in counterpart International Patent Application No. PCT/KR2016/014199.

(Continued)

*Primary Examiner* — Mulugeta Mengesha
(74) *Attorney, Agent, or Firm* — Nixon & Vanderhye, P.C.

(57) ABSTRACT

A content processing apparatus is provided. The content processing apparatus includes output circuitry configured to output a content, communication circuitry configured to communicate with a server, and a processor configured to extract, from the content, first characteristic information and second characteristic information of a different type from the first characteristic information, to control the communication circuitry to transmit the extracted first characteristic information to the server, and in response to receiving a plurality of matching information corresponding to the transmitted first characteristic information, to control the output circuitry to output matching information corresponding to the second characteristic information extracted from the content.

12 Claims, 16 Drawing Sheets

(51) Int. Cl.

| | | |
|---|---|---|
| *G06K 9/00* | (2006.01) | |
| *H04N 21/439* | (2011.01) | |
| *H04N 21/25* | (2011.01) | |
| *H04N 21/81* | (2011.01) | |
| *H04N 21/482* | (2011.01) | |
| *H04N 21/858* | (2011.01) | |

(52) U.S. Cl.
CPC ....... *H04N 21/4394* (2013.01); *H04N 21/812* (2013.01); *H04N 21/4826* (2013.01); *H04N 21/858* (2013.01)

(56) References Cited

U.S. PATENT DOCUMENTS

| | | |
|---|---|---|
| 2014/0075470 A1 | 3/2014 | Oh et al. |
| 2014/0137165 A1 | 5/2014 | Yamagishi |
| 2015/0020094 A1 | 1/2015 | Moon et al. |
| 2015/0110340 A1* | 4/2015 | Harron ............... G06K 9/00744 382/100 |
| 2015/0208117 A1 | 7/2015 | Kim et al. |
| 2015/0254497 A1 | 9/2015 | Jang et al. |
| 2015/0256905 A1 | 9/2015 | Lee et al. |
| 2015/0264450 A1 | 9/2015 | Jung |
| 2015/0281765 A1 | 10/2015 | Lee et al. |

FOREIGN PATENT DOCUMENTS

| | | |
|---|---|---|
| KR | 10-2014-0125766 | 10/2014 |
| KR | 10-2015-0056523 | 5/2015 |
| KR | 10-2015-0084798 | 7/2015 |
| KR | 10-2015-0104358 | 9/2015 |
| KR | 10-2015-0104422 | 9/2015 |
| KR | 10-2015-0107464 | 9/2015 |
| KR | 10-2015-0111776 | 10/2015 |

OTHER PUBLICATIONS

Extended Search Report dated Apr. 13, 2017 in counterpart European Patent Application No. 16202881.5.
Korean Office Action (6 pages) w/ English Translation of Korean Office Action (5 pages) for KR10-2015-0176288, dated Aug. 26, 2016.
Examination Report dated Sep. 27, 2017, issued by the European Patent Office for European Patent Application No. 16202881.5.

* cited by examiner

CONTENT PROCESSING APPARATUS, CONTENT PROCESSING METHOD THEREOF, SERVER INFORMATION PROVIDING METHOD OF SERVER AND INFORMATION PROVIDING SYSTEM

CROSS-REFERENCE TO RELATED APPLICATION

This application is based on and claims priority under 35 U.S.C. § 119 to Korean Patent Application No. 10-2015-0176288, filed in the Korean Intellectual Property Office on Dec. 10, 2015, the disclosure of which is incorporated by reference herein in its entirety.

BACKGROUND

1. Field

The present disclosure relates generally to a content processing apparatus, a server, an information providing method of a server, and an information providing system, and for example, to a content processing apparatus, a content processing method, a server, an information providing method of a server, and an information providing system which are capable of accurately recognizing content using different types of characteristic information.

2. Description of Related Art

As user needs become more diverse, a source of broadcast content or multimedia content have become more diverse from a single source based on public TV to various sources such as cable, Internet Protocol TV (IPTV), etc. In addition, sources which provide information on customized advertisement, program recommendation, etc. have been introduced.

It is necessary to provide such information on customized advertisement, program recommendation, etc. to be suitable for a scene being output. For example, it is most effective when an advertisement message regarding a particular product is together displayed when a scene where the product is exposed is displayed. Accordingly, a technique of recognizing an image currently displayed is required by a display apparatus.

For this purpose, a technique of recognizing an image by extracting characteristic data from an image being output and comparing the extracted characteristic data with pre-stored data has been introduced. However, in the related-art content recognition technique, different contents include the same scene and thus, when the same characteristic information is extracted, each piece of content could not be distinguished from each other.

SUMMARY

One or more example embodiments provide a content processing apparatus, which may more accurately recognize content using different types of characteristic information, a content processing method, a server, an information providing method of a server and an information providing system.

According to an aspect of an example embodiment, a content processing apparatus is provided, including: an output unit comprising output circuitry configured output a content; a communicator comprising communication circuitry configured to communicate with a server; and a processor configured to extract, from the content, first characteristic information and second characteristic information of a different type from the first characteristic information, to control the communication circuitry to transmit the extracted first characteristic information to the server, and in response to receiving a plurality of matching information corresponding to the transmitted first characteristic information, to control the output circuitry to output matching information corresponding to the second information extracted from the content from among the plurality of matching information.

The first characteristic information may be video characteristic information or audio characteristic information, and the second characteristic information may be video characteristic information or audio characteristic information of a different type from the first characteristic information.

The communicator may receive, from the server, the plurality of matching information and a plurality of second characteristic information corresponding to each of the plurality of matching information, and the processor may control the output unit to output matching information corresponding to the second characteristic information extracted from the content from among the plurality of matching information based on a result of comparison of the plurality of second characteristic information and the second characteristic information extracted from the content.

The plurality of matching information may include additional information, and the additional information may include at least one of: advertisement information, content recommendation information, polling information and URL information related to the content.

The processor may, in response to occurrence of one of a first event where a preset time period starts, a second event where a source which provides a content is changed, or a third event where a channel is changed, extract first characteristic information and second characteristic information from a content currently being output.

The processor may control the communicator to transmit, to the server, matching information corresponding to the second characteristic information extracted from the content from among the plurality of matching information as content recognition information.

According to an example embodiment, a server is provided, including: a communicator comprising communication circuitry configured to receive first characteristic information from a content processing apparatus; and a processor configured to, in response to retrieving a plurality of first characteristic information matched with the received first characteristic information, control the communication circuitry to transmit, to the content processing apparatus, a plurality of matching information corresponding to each of the plurality of retrieved first characteristic information and a plurality of second characteristic information corresponding to each of the plurality of retrieved first characteristic information.

The first characteristic information may be video characteristic information or audio characteristic information, and the second characteristic information may be video characteristic information or audio characteristic information of a different type from the first characteristic information.

The plurality of matching information may include additional information, and the additional information may include at least one of: advertisement information, content recommendation information, polling information and URL information related to the content.

The processor may, in response to receiving content recognition information from the content processing apparatus, with respect to first characteristic information received from the content processing apparatus after receiving the content recognition information, perform retrieval within a search range corresponding to the received content recognition information.

The processor may, in response to retrieving one first characteristic information matched with the received first characteristic information, control the communicator to transmit, to a view data collection server, matching information corresponding to the retrieved first characteristic information.

According to an example embodiment, an information providing system is provided, including: a display apparatus configured to extract first characteristic information and second characteristic information from a content, and to transmit the extracted first characteristic information to a server; and a server configured to transmit matching information corresponding to the first characteristic information received from the display apparatus to the display apparatus, wherein the display apparatus may, in response to receiving a plurality of matching information from the server, be configured to display matching information corresponding to the second characteristic information extracted from the content from among the plurality of matching information.

According to an example embodiment, a content processing method is provided, including: outputting a content; extracting, from the content, first characteristic information and second characteristic information of a different type of the first characteristic information; transmitting the extracted first characteristic information to a server; receiving a plurality of matching information corresponding to the transmitted first characteristic information from the server; and outputting matching information corresponding to the second characteristic information extracted from the content from among the plurality of matching information.

The first characteristic information may be video characteristic information or audio characteristic information, and the second characteristic information may be video characteristic information or audio characteristic information of a different type from the first characteristic information.

The receiving may include receiving, from the server, the plurality of matching information and a plurality of second characteristic information corresponding to each of the plurality of matching information, and the outputting may include outputting matching information corresponding to the second characteristic information extracted from the content from among the plurality of matching information based on a result of comparison of the plurality of second characteristic information and the second characteristic information extracted from the content.

The plurality of matching information may include additional information, and the additional information may include at least one of: advertisement information, content recommendation information, polling information and URL information related to the content.

The extracting may include, in response to an occurrence of a first event where a preset time period starts, a second event where a source which provides a content is changed, or a third event where a channel is changed, extracting first characteristic information and second characteristic information from a content currently being output.

The method according to the present disclosure may further include transmitting, to the server, matching information corresponding to the second characteristic information extracted from the content from among the plurality of matching information as content recognition information.

According to an example embodiment, an information providing method of a server is provided, including: receiving first characteristic information from a content processing apparatus; retrieving first characteristic information matched with the received first characteristic information; and in response to retrieving a plurality of first characteristic information matched with the received first characteristic information, transmitting, to the content processing apparatus, a plurality of matching information corresponding to each of the plurality of retrieved first characteristic information and a plurality of second characteristic information corresponding to each of the plurality of retrieved first characteristic information.

The retrieving may, in response to receiving content recognition information from the content processing apparatus, with respect to first characteristic information received from the content processing apparatus after receiving the content recognition information, performing retrieval within a search range corresponding to the received content recognition information.

BRIEF DESCRIPTION OF THE DRAWINGS

The above and other aspects of present disclosure will become more apparent from the following detailed description, taken in conjunction with the accompanying drawings, in which like reference numerals refer to like elements, and wherein.

DETAILED DESCRIPTION

Figure 1:
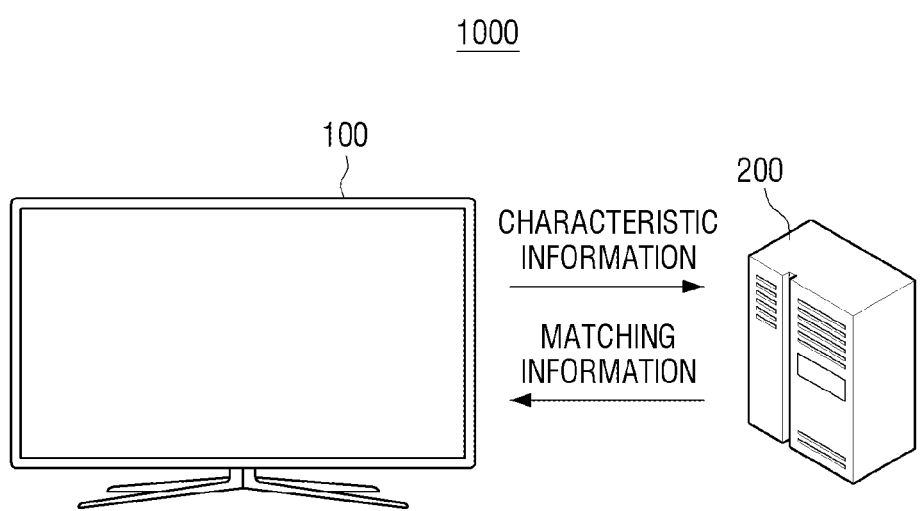
FIGS. 1 and 2 are diagrams illustrating an example information provision system, according to various example embodiments.

Hereinafter, the terms used in the description will be described briefly, and example embodiments will be described in greater detail with reference to the accompanying drawings.

With respect to the terms used in various example embodiments of the disclosure, general terms currently and widely used are selected in view of function with respect to the disclosure. However, the terms may vary according to an intention of a technician practicing in the pertinent art, an advent of new technology, etc. In specific cases, terms may be chosen arbitrarily, and in this case, definitions thereof will be described in the description of the corresponding disclosure. Accordingly, the terms used in the description should not necessarily be construed as simple names of the terms, but be defined based on meanings of the terms and overall contents of the present disclosure.

The example embodiments may vary, and may be provided in different example embodiments. Various example embodiments will be described with reference to accompanying drawings. However, this does not necessarily limit the scope of the example embodiments to a specific embodiment form. Instead, modifications, equivalents and replacements included in the disclosed concept and technical scope of this disclosure may be employed. While describing example embodiments, if it is determined that the description regarding a known technology obscures the gist of the disclosure, a detailed description may be omitted.

The term such as "first" "second", and so on may be used to explain a variety of elements, but the elements should not be limited thereto. The terms are used to distinguish one entity from another entity, without necessarily implying any actual relationship or order between such entities.

A singular term includes a plural form unless otherwise indicated. The terms, "include," "comprise," "is configured to," etc. of the description are used to indicate the existence of features, numbers, steps, operations, elements, parts or combination thereof, and do not exclude the possibilities of combination or addition of one or more features, numbers, steps, operations, elements, parts or combination thereof.

In an example embodiment, 'a module' or 'a unit' performs at least one function or operation, and may be realized as hardware (e.g., circuitry), software, or combination thereof. Further, except the "modules" or "units" that have to be implemented by certain hardware, a plurality of "modules" or a plurality of "units" may be integrated into at least one module and realized as at least one processor (not illustrated), such as, for example, and without limitation, a dedicated processor, various processing circuitry, or the like.

In an example embodiment, in the case where a part is "connected" to another part, the case also includes a case where the part is "electrically connected" to the other part with or without another element interposed therebetween.

Hereinafter, the example embodiments will be described in greater detail in a manner that will be understood by one of ordinary skill in the art. The example embodiments may be implemented by various forms, and is not limited to the example embodiments described herein. Further, those elements, features, or the like that are irrelevant to the disclosure may be omitted so as to describe example embodiments more clearly, and similar drawing reference numerals are used for the similar elements throughout the disclosure.

Hereinafter, the present disclosure will be described in greater detail with reference to the accompanying drawings.

FIG. 1 is a diagram illustrating an example information providing system, according to an example embodiment.

Referring to FIG. 1, the information providing system 1000 includes a content processing apparatus 100 and a server 200.

The content processing apparatus 100 may refer, for example, to an apparatus capable of extracting characteristic information from content to recognize the content. For example, the content processing apparatus 100 may, as non-limiting examples, be realized as a display apparatus capable of displaying content, such as a TV, PC, laptop PC, cell phone, tablet PC, PDA, or the like.

The content processing apparatus 100 may output content. To output content may, for example, refer to outputting an image and/or a sound through a display or a speaker included in the content processing apparatus 100.

In addition, the content processing apparatus 100 may extract first characteristic information and second characteristic information of a different type from the first characteristic information from content currently being output, and transmit the extracted first characteristic information to the server 200.

For example, the content processing apparatus 100 may extract characteristic information from an image or a sound of content. In the present disclosure, characteristic information extracted from an image may, for example, refer to video characteristic information, and characteristic information extracted from a sound may, for example, refer to audio characteristic information. If the first characteristic information is video characteristic information, the second characteristic information may be audio characteristic information. If the first characteristic information is audio characteristic information, the second characteristic information may be video characteristic information.

Such video or audio characteristic information may include a video fingerprint or an audio fingerprint, or the like.

The fingerprint refers to data exclusive for an image or a sound in a section of content. For example, the fingerprint may refer, for example, to characteristic information extracted from an image signal or an audio signal, which reflects characteristics exclusive for a signal itself, unlike text-based metadata. Accordingly, the fingerprint may be referred to as fingerprint data, DNA data, or gene data. For example, an audio fingerprint extracted from an audio signal may refer, for example, to information indicating characteristics such as a frequency, amplitude, etc. of the audio signal, and a video fingerprint extracted from an image signal may refer, for example, to information indicating characteristics such as a motion vector, color, etc. of the image signal.

A fingerprint may be extracted by various conventionally known algorithms. For example, an audio signal may be divided at intervals of a predetermined time, and a size of a signal of frequencies included in each of the intervals may be determined. In addition, a difference of size between signals in adjacent frequency intervals may be obtained to determine a frequency inclination, and if the inclination is positive, the inclination may be quantized to 1, and if the inclination is negative, the inclination may be quantized to 0, thereby generating a fingerprint.

The above-mentioned fingerprint may be used in automatic contents recognition (ACR) technology, which is apparent to one of ordinary skill in the art. Thus, the detailed explanation will be omitted herein.

The server 200 may refer, for example, to an apparatus which is capable of processing a query request of ACR received from the content processing apparatus 100. It may be variously referred to as a matching server as well. Although FIG. 1 illustrates only one server, a plurality of servers may be present.

For example, the server 200 may transmit matching information corresponding to first characteristic information received from the content processing apparatus 100 to the content processing apparatus 100. In other words, the matching information may be provided in response to transmission of the first characteristic information from the content processing apparatus 100 to the server 200.

For example, the server 200 may include a database including characteristic information extracted from various contents, and content information may be tagged (or indexed) with each of the characteristic information of that database. In this example, the content information may, for example be, when a content is a live broadcast, EPG metadata for each channel, and when the content is a content such as VOD and OTT or a custom content, information on pre-recorded content.

In addition, each of characteristic information of a database of the server 200 may correspond to additional information. The additional information may refer, for example, to information which may be provided along with output of content, which may include, for example, advertisement information, content recommendation information, poll information, universal resource locator (URL) information, or the like, but is not limited thereto. Herein, the URL information may refer, for example, to connection information regarding information related to content. The above-mentioned additional information may be either stored in the server 200 or provided from an additional information provision server connected to the server 200.

The server 200 may transmit matching information including content information as mentioned above to the content processing apparatus 100. According to circumstances, the matching information may include the above-mentioned additional information.

In addition, the content processing apparatus 100 may, in response to receiving a plurality of matching information corresponding to first characteristic information transmitted from the server 200, select matching information corresponding to second characteristic information extracted from content from among the plurality of matching information. In addition, the content processing apparatus 100 may perform various operations based on the selected matching information. For example, the content processing apparatus 100 may output advertisement information, or the like, included in the matching information, or may store the matching information as content recognition information to use it for example, for the purpose of collecting viewing data.

According to the above-mentioned information provision system, it is possible to recognize content currently being output using characteristic information. For example, content may be recognized using both the video characteristic information and audio characteristic information, thus improving accuracy of content recognition.

Although it is described with reference to FIG. 1 that the information provision system 1000 includes one content processing apparatus 100 and one server 200, a number of content processing apparatus may be connected to one server and a number of servers 200 may connected to one display apparatus. Other combinations are possible as well.

Figure 2:
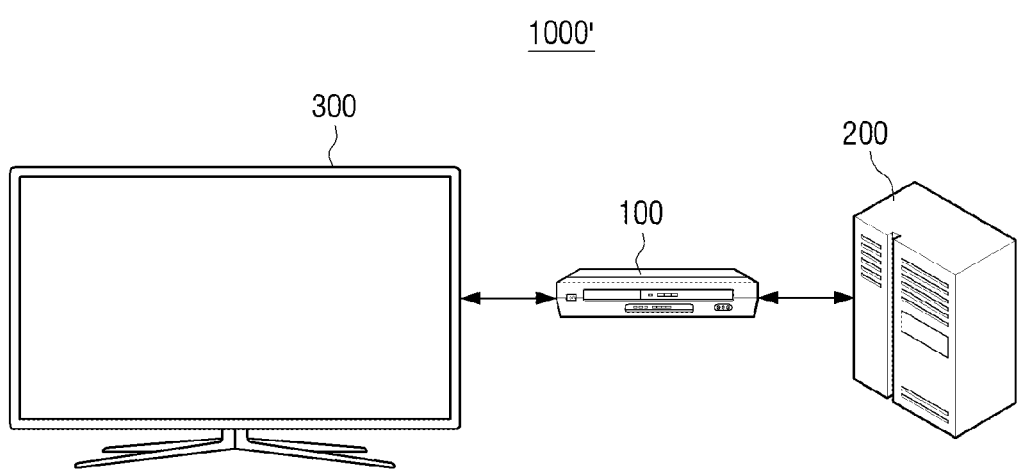

Although it is illustrated in FIG. 1 that the content processing apparatus 100 is implemented as a display apparatus, according to another example embodiment, the content processing apparatus 100 may be implemented as an external apparatus of the display apparatus as illustrated in FIG. 2.

FIG. 2 is a diagram illustrating an example information provision system 1000' according to another example embodiment.

Referring to FIG. 2, the information provision system 1000' includes a display apparatus 300, a content processing apparatus 100 and a server 200. The description of the features of the present information provision system 1000' that overlaps with the description with reference to FIG. 1 will be omitted.

In the case of the embodiment of FIG. 2, a display function is handled in the display apparatus 300 and the other functions are performed in the content processing apparatus 100. In this example, outputting content or matching information by the content processing apparatus 100 refers to transmitting the content or matching information to the display apparatus 300.

For example, the content processing apparatus 100 may be implemented as a set top box connected to the display apparatus 300. The set top box may refer, for example, to an apparatus which receives a TV broadcast signal such as a terrestrial broadcast, cable TV broadcast, satellite broadcast, etc. and outputs the received signal to the display apparatus 300, which may be referred to as a tuner box as well.

The display apparatus 300 may refer, for example, to an apparatus capable of providing content or matching information provided from the content processing apparatus 100 to provide the content or matching information to a user in an image and/or sound form.

For example, the display apparatus 300 may be implemented as various types of apparatuses, such as TV, PC, laptop PC, cellphone, tablet PC, PDA, MP3 player, kiosk, electronic frame, table display apparatus, or the like, but is not limited thereto.

It is illustrated in FIGS. 1 to 2 that only one server is provided. However, the example is not limited thereto. Two or more servers may be provided as well.

Hereinafter, the content processing apparatus 100 will be described in greater detail with reference to FIG. 3.

Figure 3:
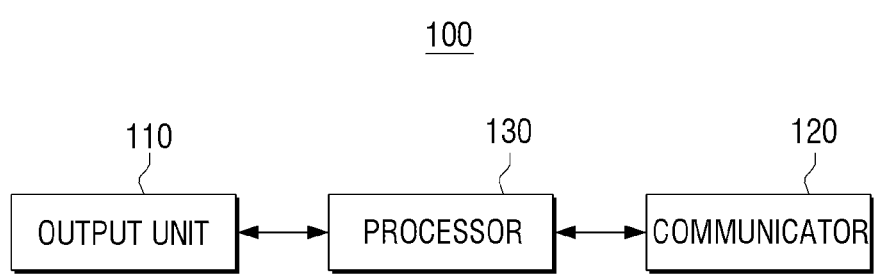
FIG. 3 is a block diagram illustrating an example configuration of a content processing apparatus, according to an example embodiment.

FIG. 3 is a diagram illustrating an example content processing apparatus 100 according to an example embodiment.

Referring to FIG. 3, the content processing apparatus 100 includes an output unit (e.g., including output circuitry) 110, a communicator (e.g., including communication circuitry) 120 and a processor (e.g., including processing circuitry) 130.

The output unit 110 may include various output circuitry for outputting content and matching information received from the server 200. If the content processing apparatus 100 is implemented as a display apparatus, the output circuitry of the output unit 110 may include, for example, and without limitation, a display or a speaker.

If the content processing apparatus 100 is implemented as an external apparatus of a display apparatus such as a set top box, the content processing apparatus 100 may be implemented as a configuration which may transmit content to the display apparatus using a predetermined communication method. In this example, the output unit 110 and the communicator 120 are not separate configurations.

The communicator 110 may include various communication circuitry for communicating with various external apparatuses. The communicator 110 may include various communication circuitry, such as, for example, and without limitation, various communication chips including, for example, one or more of a Wi-Fi chip, a Bluetooth chip, a wireless communication chip, or the like. The Wi-Fi chip and the bluetooth chip communicate in a Wi-Fi method and a Bluetooth method, respectively. The wireless communication chip may refer, for example, to a chip that performs communication according to various communication standards such as institute of electrical and electronics engineers (IEEE), Zigbee, 3rd generation (3G), 3rd generation partnership project (3GPP), long term evolution (LTE), and so on. In addition, the communicator 110 may further include a near field communication (NFC) chip which is operated in an NFC method.

For example, the communicator 110 may transmit first characteristic information extracted from content to the server 200, and receive matching information corresponding to the first characteristic information from the server.

For example, the server 200 may retrieve first characteristic information which coincides with first characteristic information received from the content processing apparatus 100 or first characteristic information of which similarity is higher than a preset threshold value from a database of the server 200. For example, if the first characteristic information received from the content processing apparatus 100 is video characteristic information, the server 200 retrieves video characteristic information that coincides with the received video characteristic information or video characteristic information of which similarity is higher than a preset threshold value from a database. When the video characteristic information is retrieved, the server may transmit content information corresponding to the retrieved video characteristic information and audio characteristic information corresponding to the retrieved video characteristic information to the content processing apparatus 100 as matching information. If additional information corresponding to the retrieved video characteristic information exists or desired to be provided, the server may transmit the additional information to the content processing apparatus as matching information together with the content information and the audio characteristic information.

In another example, if the first characteristic information received from the content processing apparatus 100 is audio characteristic information, the server 200 may retrieve audio characteristic information that coincides with the received audio characteristic information or audio characteristic information of which similarity is higher than a preset threshold value from the database. When the audio characteristic information is retrieved, the server may transmit content information corresponding to the retrieved audio characteristic information and audio characteristic information corresponding to the retrieved audio characteristic information to the content processing apparatus 100 as matching information. If additional information corresponding to the retrieved audio characteristic information exists or is desired to be provided, the server may transmit the additional information to the content processing apparatus as matching information together with the content information and the video characteristic information.

In other words, the matching information received through the communicator 120 may include content information, second characteristic information and (optionally) additional information corresponding to the first characteristic information transmitted to the server 200.

In this example, the content information may, for example, be information on content corresponding to the first characteristic information transmitted to the server 200. As a specific example, the content information may be, when a content is a live broadcast, EPG metadata for each channel, and may be, when the content is content such as VOD and OTT or custom content, information on pre-recorded content. In addition, the additional information may include, for example, advertisement information, content recommendation information, poll information, or the like.

The processor 130 may include various processing circuitry for controlling an overall operation of the content processing apparatus 100. For example, the processor 130 controls an overall operation of the content processing apparatus 100 using various programs stored in a storage (not shown) of the content processing apparatus 100. For example, the processor 130 may include various circuitry including, but not limited to, a CPU, RAM, ROM and system bus. In this example, the ROM may refer, for example, to a configuration in which a command set for system booting is stored, and the CPU copies an operating system (O/S) stored in the storage of the content processing apparatus 100 to the RAM, executes the O/S, and boots the system. When the booting is completed, the CPU may copy various applications stored in the storage into the RAM, and execute the applications copied into the RAM to perform various operations. It is described above that the processor 130 includes only one CPU; however, the processor 130 may be implemented as a plurality of processing circuitry, such as, for example, and without limitation, a plurality of CPU (or DSP, SoC, etc.).

For example, the processor 130 may extract first characteristic information from content currently being output and second characteristic information which is of a different type from the first characteristic information. The processor 130 may extract characteristic information from content in the example method described below.

For example, the processor 130 may divide an audio signal including content at intervals of a predetermined time, and determine a size of a signal of frequencies included in each of the time intervals. In addition, a difference of size between signals in adjacent frequency intervals is obtained to determine a frequency inclination, and if the inclination is positive, the inclination may, for example, be quantized to 1, and if the inclination is negative, the inclination may, for example, be quantized to 0, thereby extracting audio characteristic information.

As another example, the processor 130 may extract a feature point including a predetermined coordinate within an image frame including content and sizes of a vector of the coordinate by a predetermined standard. In addition, several feature points may be selected in an order from largest to smallest. When a predetermined relationship among the selected feature points is set, video characteristic information with respect to one image frame may be extracted. Further to the above-mentioned examples, various fingerprint extraction algorithms may be used to extract first characteristic information and second characteristic information.

In addition, the processor 130 may control the communicator 120 to transmit first characteristic information among the first characteristic information and second characteristic information extracted from content to the server 200.

In addition, one matching information corresponding to the first characteristic information transmitted from the server 200 may be received, or a plurality of matching information may be received.

When a plurality of matching information is received, the processor 130 may select matching information corresponding to the second characteristic information extracted from the content from among the plurality of matching information. In this example, when the first characteristic information is video characteristic information, the second characteristic information is audio characteristic information. In addition, when the first characteristic information is audio characteristic information, the second characteristic information is video characteristic information.

For example, the second characteristic information may include each of the plurality of matching information, and the processor 130 compares pre-extracted second characteristic information and the second characteristic information included in each of the plurality of matching information to select matching information including second characteristic information which coincides with the pre-extracted second characteristic information or of which similarity is higher than a preset threshold value.

The examples where a plurality of matching information are received include, but are not limited to, the following: for example, there may be a plurality of contents which show the same screen but may be broadcasted in different languages. For example, a live world cup broadcast may be provided in two channels, one in English, the other in Spanish. The above example will be described in greater detail with reference to FIG. 4 below.

Figure 4:
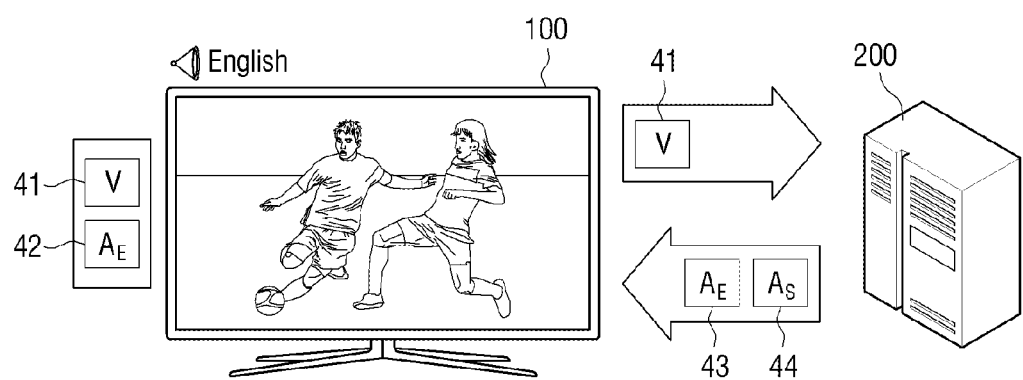
FIGS. 4, 5, 6A and 6B are diagrams illustrating an example communication between a content processing apparatus and a server, according to various example embodiments.

FIG. 4 is a diagram illustrating an example in which a content processing apparatus receives a plurality of matching information.

Referring to FIG. 4, the server 200 includes a characteristic information database of a soccer match content broadcasted in English and a characteristic information database of a soccer match content broadcasted in Spanish. In addition, the content processing apparatus 100 outputs the soccer match content broadcasted in English, wherein video characteristic information 41 and audio characteristic information 42 are extracted from any one scene. In addition, the content processing apparatus transmits the extracted video characteristic information 41 to the server 200.

The server 200 may find video characteristic information corresponding to the video characteristic information 41 in the characteristic information database of the soccer match content broadcasted in English, and also in the characteristic information database of the soccer match content broadcasted in Spanish. Accordingly, the server 200 transmits two matching information 43, 44 to the content processing apparatus 100. One of them is matching information 43 corresponding to the soccer match content broadcasted in English, and the other one is matching information 44 corresponding to the soccer match content broadcasted in Spanish.

In addition, the content processing apparatus 100 may select the matching information 43 corresponding to pre-extracted audio characteristic information 42 from among the plurality of received matching information 43, 44 to recognize content.

As described above, while the same images are shown, the audio recognizes different contents, when only video characteristic information is used, a plurality of matching information is acquired and thus, it cannot be known which content the scene belongs to. However, when the content processing apparatus 100 transmits video characteristic information to the server 200, and filters the plurality of received matching information into audio characteristic information, it can be known which content the scene belongs to.

Another example of receiving a plurality of matching information may be that similar scenes are continuously shown but a conversation differs continuously. The above case will be described in greater detail with reference to FIG. 5 below.

Figure 5:
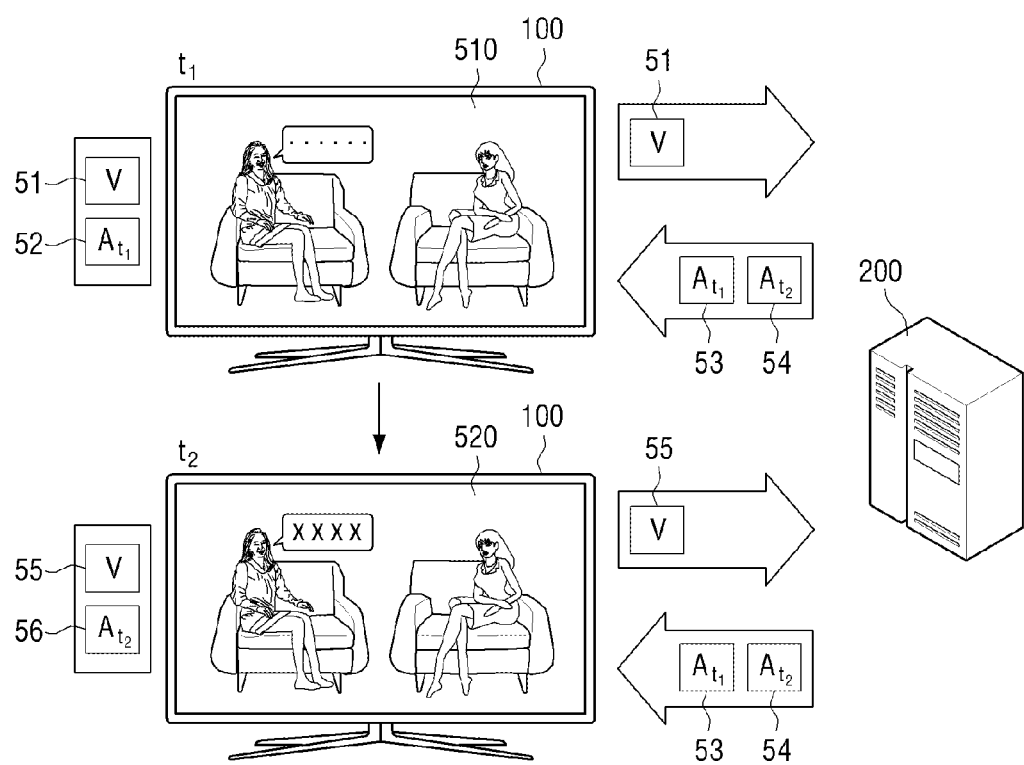

FIG. 5 is a diagram illustrating another example in which a content processing apparatus receives a plurality of matching information.

Referring to FIG. 5, the content processing apparatus 100 outputs a talk show content. While output scenes at time $t_1$ and $t_2$ are different, a topic about which the cast are talking is different. In addition, the server 200 has characteristic information database of the talk show content.

At time $t_1$, video characteristic information 51 and audio characteristic information 52 are extracted from the scene 510. In addition, the extracted video characteristic information 51 is transmitted to the server 200.

The server 20 may find a plurality of characteristic information corresponding to the received video characteristic information 51 in a characteristic information database of the talk show content. Accordingly, the server 200 transmits a plurality of matching information 53, 54 to the content processing apparatus 100. One of them is matching information 53 corresponding to a scene at time $t_1$, and the other one is matching information 54 corresponding to a scene at time $t_2$.

In addition, the content processing apparatus 100 may select the matching information 53 corresponding to pre-extracted audio characteristic information 52 from among the plurality of received matching information 53, 54 to recognize content.

Likewise, at time $t_2$, video characteristic information 55 and audio characteristic information 56 are extracted from the scene 520. In addition, the extracted video characteristic information 55 is transmitted to the server 200.

The server 20 may find a plurality of characteristic information corresponding to the received video characteristic information 55 in a characteristic information database of the talk show content. Accordingly, the server 200 transmits a plurality of matching information 53, 54 to the content processing apparatus 100. One of them is matching information 53 corresponding to a scene at time $t_1$, and the other one is matching information 54 corresponding to a scene at time $t_2$.

In addition, the content processing apparatus 100 may select the matching information 53 corresponding to pre-extracted audio characteristic information 56 from among the plurality of received matching information 54, 54 to recognize content.

As described above, while the displayed image remains unchanged the audio may be changed, when only video characteristic information is used, a plurality of matching information is acquired and thus, it cannot be known which content the scene belongs to. However, when the content processing apparatus 100 transmits video characteristic information to the server 200, and filters the plurality of received matching information into audio characteristic information, it can be known which content the scene belongs to.

It is described in the embodiments of FIGS. 4 and 5 that video characteristic information is transmitted to the server 200 and the content processing apparatus 100 performs selection with reference to a plurality of matching information as audio characteristic information; however, audio characteristic information may be transmitted to the server 200 and the content processing apparatus 100 may perform selection with respect to a plurality of matching information as video characteristic information as well. The above example will be described in greater detail with reference to FIGS. 6A and 6B below.

Figure 6A:
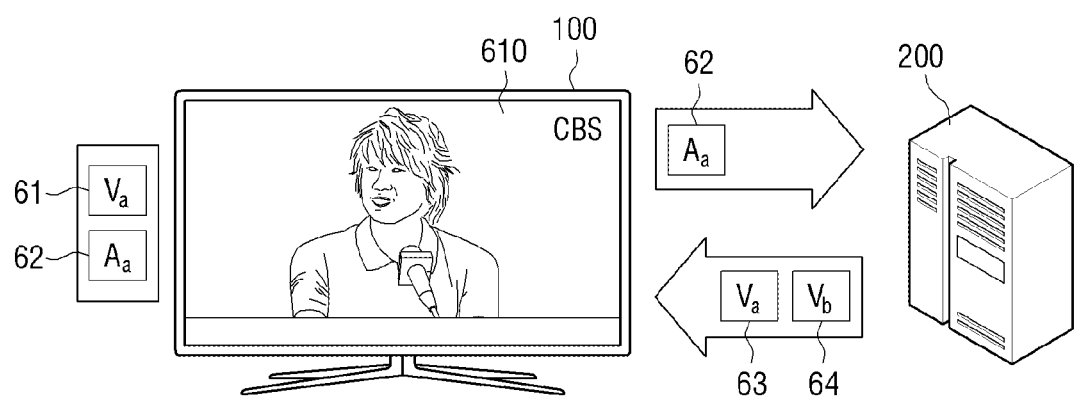
Figure 6B:
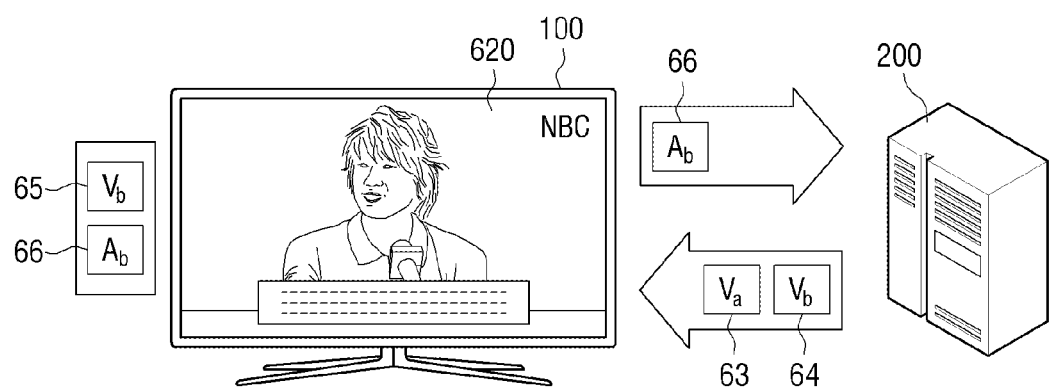

FIGS. 6A and 6B are views illustrating other examples that a content processing apparatus receives a plurality of matching information.

Referring to FIG. 6A, the content processing apparatus 100 is outputting CBS news content which live broadcasts a presidential speech. Referring to FIG. 6B, the content processing apparatus 100 is outputting NBC news content which live broadcasts a presidential speech. That is, FIGS. 6A and 6B output the same audio but outputs different images.

In addition, the server 200 includes a characteristic information database of the CBS news content and a characteristic information database of the NBC news content.

As illustrated in FIG. 6A, video characteristic information 61 and audio characteristic information 62 are extracted from any one scene 610 of the CBS news content, and the extracted audio characteristic information 62 is transmitted to the server 200. The server 200 may find audio characteristic information corresponding to the received audio characteristic information 62 in the characteristic information database of the CBS news content, and also in the characteristic information database of the NBC news content. Accordingly, the server 200 transmits two matching information 63, 64 to the content processing apparatus 100. One of them is matching information 63 corresponding to the CBS news content, and the other one is matching information 64 corresponding to the NBC news content.

In addition, the content processing apparatus 100 may select the matching information 63 corresponding to pre-extracted audio characteristic information 61 from among the plurality of received matching information 63, 64 to recognize content.

As illustrated in FIG. 6B, video characteristic information 65 and audio characteristic information 66 are extracted from any one scene 620 of the NBC news content, and the extracted audio characteristic information 66 is transmitted to the server 200. The server 200 may find audio characteristic information corresponding to the received audio characteristic information 66 in the characteristic information database of the CBS news content, and also in the characteristic information database of the NBC news content. Accordingly, the server 200 transmits two matching information 63, 64 to the content processing apparatus 100. One of them is matching information 63 corresponding to the CBS news content, and the other one is matching information 64 corresponding to the NBC news content.

In addition, the content processing apparatus 100 may select the matching information 63 corresponding to pre-extracted audio characteristic information 65 from among the plurality of received matching information 64, 64 to recognize content.

As described above, with respect to content which outputs the same audio but different images, when only audio characteristic information is used, a plurality of matching information is acquired and thus, it cannot be known which content the scene belongs to. However, when the content processing apparatus 100 transmits audio characteristic information to the server 200, and filters the plurality of received matching information into video characteristic information, it can be known which content the scene belongs to.

It is described above that the processor 130 transmits only first characteristic information from among the first characteristic information and second characteristic information to the server 200 to control the communicator 120; however, according to another example embodiment, the processor 130 may control the communicator 120 to transmit both the first and second characteristic information to the server 200. In this example, the server 200 may transmit matching information corresponding to both the received first and second characteristic information to the content processing apparatus 100.

For example, in FIG. 6B, video characteristic information 65 and audio characteristic information 66 are extracted from any one scene 620 of the NBC news content, and the video characteristic information 65 and the audio characteristic information 66 may be transmitted to the server 200. The server 200, when audio characteristic information corresponding to the received audio characteristic information 66 is found in both the characteristic information database of the CBS news content and the characteristic information database of the NBC news content, that is, when two audio characteristic information is retrieved, detects video corresponding to the video characteristic information 65 from among two video characteristic information corresponding to each of the two audio characteristic information. In addition, the server 200 may transmit matching information including content information and (optionally) additional information corresponding to the detected video characteristic information to the content processing apparatus 100.

The example embodiment in which the content processing apparatus 100 transmits both the first and second characteristic information to the server 200 may reduce costs incurred from data processing in the content processing apparatus 100 compared with the example embodiments that transmit only the first characteristic information to the server 200. Since the server 200 may transmit only one matching information, not a plurality of matching information, to the content processing apparatus 100, costs incurred from data processing between the server 200 and the content processing apparatus 100 may be reduced.

Meanwhile, the processor 130 may perform various operations using content information and/or additional information included in matching information selected or received according to the above-described operation.

For example, the processor 130 may control the output unit 110 to output additional information included in matching information. The additional information may be information related to recognized content such as advertisement information, content recommendation information, polling information, or the like, but is not limited thereto.

Figure 7:
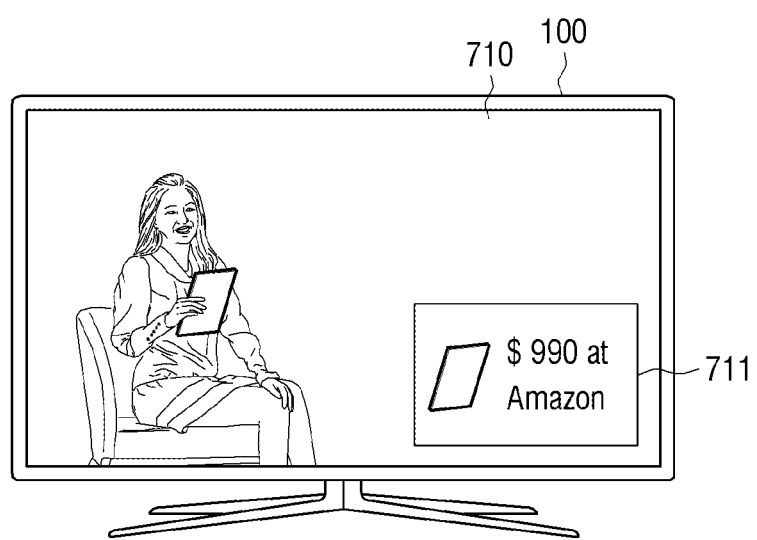
FIG. 7 is a diagram illustrating example additional information provided from a content processing apparatus, according to an example embodiment.

The advertisement information may be advertisement information related to recognized content, which may, for example, include, when content is content that advertises a particular product, information on a store which sells that particular product. In addition, the content recommendation information may be recommendation information on content related to recognized content, which may, for example, be, when the recognized content is movie content in which a particular actor performed, information on different movies in which the actor performed. For example, the content recommendation information may include information on a channel that plays another movie in which the actor performed. In addition, polling information is information for gathering comments of viewers with respect to recognized content, which may, for example, be, when the recognized content is a cooking contest content, information for displaying a pop-up window inquiring viewers of which participant will win the contest from among participants of the contest. FIG. 7 illustrates an example of outputting additional information.

FIG. 7 is a illustrating example additional information output by the content processing apparatus 100, according to an example embodiment.

Referring to FIG. 7, the content processing apparatus 100 is outputting a scene (710) of advertisement content which advertises a portable device. In the above-mentioned method, the content processing apparatus 100 may recognize the one scene 710 of the advertisement content, and output additional information 711 along with the recognized scene 710. The additional information 711 displays where a portable device of the advertisement currently being output could be purchased.

According to the above embodiment, additional information is displayed at the time when a particular product is displayed, thereby maximizing and/or increasing advertisement effect of that product. Meanwhile, to control the additional information to be displayed at the proper timing, the content processing apparatus 100 may use additional information outputting time information received from the server 200. The above case will be described in greater detail with reference to FIG. 9 below.

According to another example embodiment, the processor 130 may transmit content information included in selected matching information as content recognition information to the server 200, and the server 200 may perform a searching operation with respect to characteristic information received from the content processing apparatus thereafter, based on the received content recognition information. The present example embodiment will be described in greater detail with reference to FIG. 8.

Figure 8:
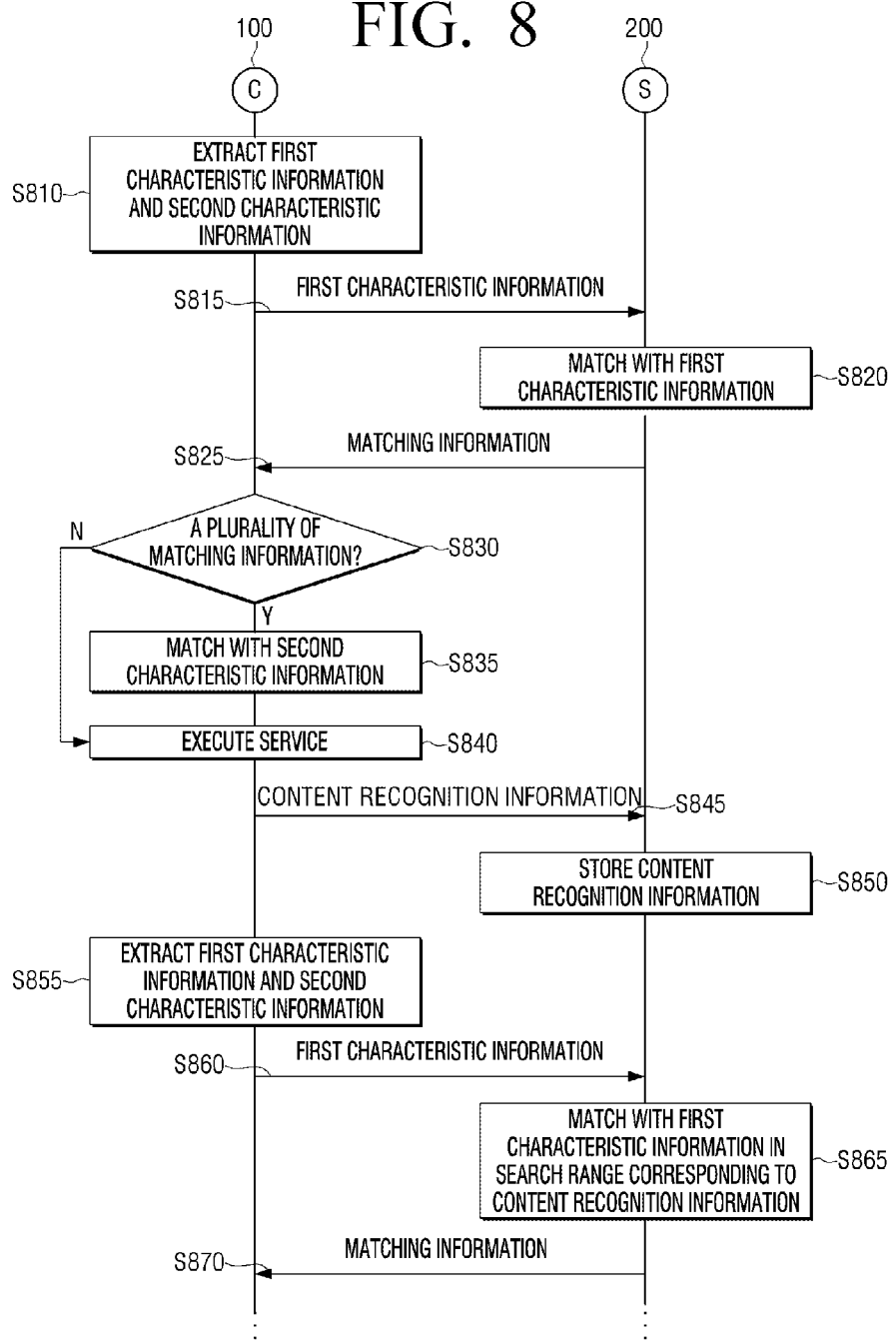
FIG. 8 is a sequence diagram illustrating an example content recognition of a content processing apparatus and a server, according to an example embodiment.

FIG. 8 is a sequence diagram illustrating an example communication between the content processing apparatus 100 and the server 200.

Referring to FIG. 8, first, the content processing apparatus 100 extracts first characteristic information and second characteristic information from content being output, at step S810.

The content processing apparatus 100 may transmit the extracted first characteristic information to the server 200 at step S815. The server 200 searches whether first characteristic information matched with the received first characteristic information is included in a database of the server 200, at step S820.

The server 200 transmits matching information to the content processing apparatus 100 as a search result at step S825. The content processing apparatus 100 determines whether a plurality of matching information are received. For example, the content processing apparatus 100 determines whether a multi-matching occurred at step S830.

As a result of determination, when only one matching information is received, for example, when multi-matching does not occur, the content processing a 100 executes a service based on the received matching information, at step S840. However, as a result of determination, when a plurality of matching information are received, for example, when multi-matching occurs, the content processing a 100 performs matching with second characteristic information extracted from the step S810, and select matching information corresponding to the second characteristic information from among the plurality of received matching information at step S835. In addition, the content processing a 100 executes a service based on the selected matching information, at step S840.

For example, an execution of service may be execution of a service which outputs additional information included in selected matching information as illustrated in FIG. 7, or execution of a service which stores selected matching information as content recognition information and transmits the content recognition information to a viewing data collection server.

In addition, the content processing apparatus 100 may transmit selected matching information to the server 100 as content recognition information, at step S845, and the server 100 may store the received content recognition information, at step S850. In this example, information transmitted to the server 100 as content recognition information may be second characteristic information used in step S835. It is described in FIG. 8 that content recognition information is separately transmitted; however, the content recognition information may be transmitted along with the first characteristic information at step S860.

In addition, the server 100 may recognize what content currently being output in the content processing apparatus 100 is based on the received content recognition information. Accordingly, the server 200 performs matching in a search range corresponding to the received content recognition information without the need to perform matching with respect to all contents.

For example, while first characteristic information and second characteristic information are extracted from the content processing apparatus, in response to the extracted first characteristic information being transmitted to the server, at step S860, the server searches whether first characteristic information matched with the received first characteristic information is in a database of the server 200 only within the search range corresponding to the content recognition information, at step S865. In addition, the server 200 transmits the search result to the content processing apparatus 100 as matching information at step S870, and repeats the above-mentioned steps S830 and S835 thereafter.

According to the present example embodiment, a search range performed in the server 200 may be reduced and thus, the server 200 may provide the search result to the content processing apparatus 100 promptly and a possibility of occurrence of multi-matching may be further reduced.

The present example embodiment is based on a presumption that the content processing apparatus 100 outputs the same content even after it transmits content recognition information to the server 200; however, if content is changed in the content processing apparatus 100, the server 200 may have to expand the search range to all contents.

To achieve this, the content processing apparatus 100 may, when an event that content is changed is generated, immediately notify the server of the event. In this example, the content processing apparatus 100 performs an operation of extracting characteristic information at the time when an event that content is changed is generated, and transmit information indicating content change along with the extracted characteristic information to the server 200. Accordingly, since the server may know that the content has been changed, the server may expand the search range to all contents, and performs search with the received characteristic information.

Meanwhile, the processor 130 may perform an operation of extracting characteristic information for each frame of content; however, the processor 130 may perform an operation of extracting characteristic information only when a particular event occurs.

For example, when an event in which content is changed occurs as mentioned above, the processor 130 may extract first characteristic information and second characteristic information from content currently being output. The event that content is changed may include an event where a source which provides the content is changed and an event where a channel is changed. For example, the event where a source which provides the content is changed may be determined based on whether an external input conversion command is received, and the event where a channel is changed may be determined based on whether a channel change command is received. The content processing apparatus 100 may receive the above-mentioned commands from a remote control apparatus such as a remote controller.

As another example, the processor 130 may, when an event where a preset period starts occurs, extract first characteristic information and second characteristic information from content currently being output. The shorter the period, the more accurate content recognition. However, since the costs for data processing is increased, it is necessary to set an appropriate period.

Figure 9:
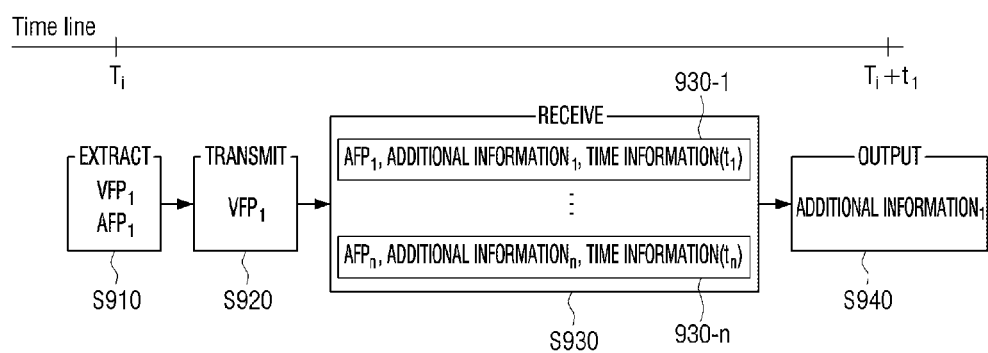
FIG. 9 is a diagram illustrating an example additional information providing method of a content processing apparatus, according to an example embodiment.

FIG. 9 is a diagram illustrating an example of displaying of additional information by the content processing apparatus 100, according to an example embodiment.

Referring to FIG. 9, the time line refers to elapse of time. While the content processing apparatus 100 is outputting content, at time the processor 130 extracts video characteristic information ($VFP_1$) and audio characteristic information ($AFP_1$) from the content, at step S910.

The processor 130 transmits the extracted video characteristic information ($VFP_1$) through the communicator 120, at step S920. In response to the above, a plurality of matching information 930-1 to 930-$n$ may be received from the server 200, at step S930.

Each of the plurality of matching information 930-1 to 930-$n$ may include audio characteristic information $AFP_1$, $AFP_n$, additional information (e.g., additional information 1, additional information n) and time information (time information $t_1$, time information $t_n$). The time information is information which informs a time when additional information is to be output. Meanwhile, not all matching information includes audio characteristic information. For example, when the characteristics of audio is mute or not recognizable, matching information may not include an audio fingerprint and instead, may include a preset message indicating the audio fingerprint.

In addition, the plurality of matching information 930-1 to 930-$n$ may include information on $VFP_1$ extracted from the content processing apparatus 100 or information on a time when $VFP_1$ is extracted. Based on the above time information, the content processing apparatus 100 may identify that the plurality of received matching information 930-1 to 930-$n$ are a response to characteristic information extracted from content outputted at a time corresponding to the time information.

The processor 130 may determine a time when additional information 1 is to be output using time information $t_1$ of matching information 930-1 having characteristic information that coincides with audio characteristic information AFP1 extracted in the extracting, step S910, from among the plurality of matching information 930-1 to 930-$n$. For example, additional information 1 is output at a time of $T_i+t_1$, at step S940 which is acquired from adding time information $t_1$ to a time, $T_i$, when the video characteristic information $VFP_1$ and the audio characteristic information $AFP_1$. For example, the content processing apparatus 100 may receive additional information 1 to be displayed at the time $T_i+t_i$ in advance, to thereby output additional information 1 accurately at the time $T_i+t_1$.

According to the above example embodiment, based on time information received from the server 200, the content processing apparatus 100 may output additional information suitable for a particular scene of content together with that particular scene at a more exact time of when the particular scene is output.

Figure 10:
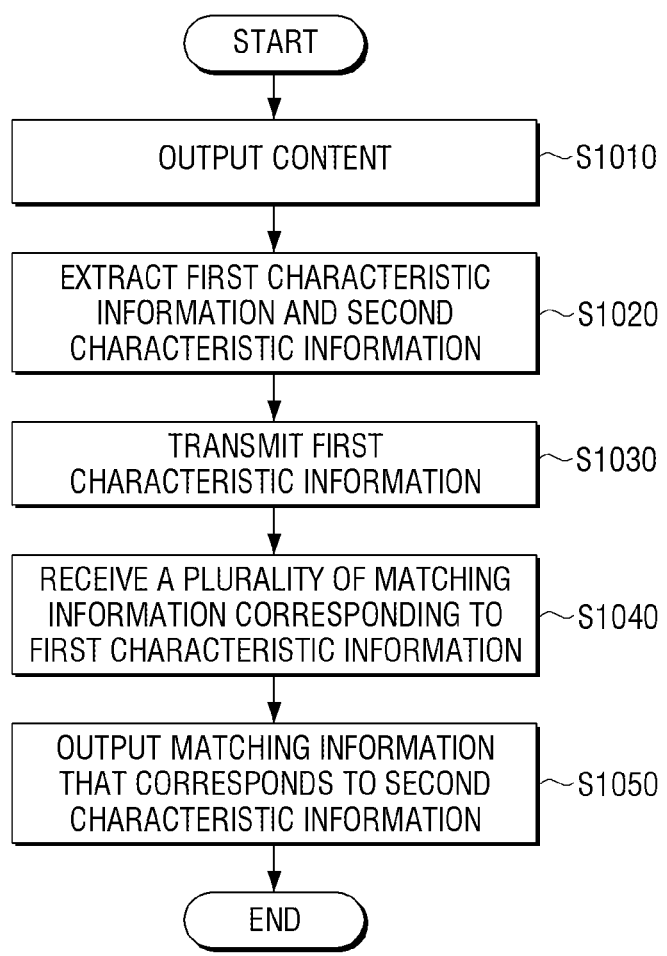
FIG. 10 is a flowchart illustrating an example content processing method, according to an example embodiment.

FIG. 10 is a flowchart illustrating an example content processing method of a content processing apparatus, according to an example embodiment.

Referring to FIG. 10, a content processing apparatus outputs content, at step S1010. The content may be provided from various sources. For example, the content may be broadcast content provided from a broadcasting station and an external input content provided from an external source.

In addition, the content processing apparatus extracts, from the content, first characteristic information and second characteristic information of a different type from the first characteristic information at step S1020. The extracted first characteristic information and second characteristic information are characteristic information extracted from an image and sound of a particular scene (or frame) of the content. The characteristic information may be a fingerprint which is inherent information of that particular scene.

In addition, the content processing apparatus transmits the extracted first characteristic information to the server, at step S1030. For example, the content processing apparatus may transmit an ACR inquiry request message including first characteristic information to the server. In this example, a frequency of transmitting the ACR inquiry request message may differ depending on the content. For example, in the case of content having a lot of additional information to be inserted, an inquiry frequency is controlled high. In the case of content having relatively less additional information to be inserted, an inquiry frequency may be controlled low.

In this example, the server may be called an ACR server and/or a fingerprint server. The server may search an ACR database for first characteristic information included in the ACR inquiry request message to identify content corresponding to the first characteristic information, and transmit an ACR inquiry response message regarding the identified content to the content processing apparatus. In this example, the ACR inquiry response message may be called matching information.

For example, the content processing apparatus receives a plurality of matching information corresponding to the first characteristic information in response to the received first characteristic information, at step S1040.

In addition, the content processing apparatus outputs matching information corresponding to second characteristic information extracted from the content from among the plurality of matching information, at step S1050. For example, the content processing apparatus extracts the first characteristic information and the second characteristic information, stores the extracted second characteristic information, and then selects one of a plurality of matching information with the stored second characteristic information when a plurality of matching information is received from the server.

Various example embodiments of the present disclosure may be implemented by a computer or a recording medium which is readable with an apparatus similar to the computer using software, hardware or a combination thereof. Hardware-wise, the example embodiments described in the present disclosure may be implemented using various processing circuitry, such as, for example, and without limitation, at least one of: dedicated processors, application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, CPUs and an electrical unit for performing other functions. In some cases, the example embodiments of the present disclosure may be implemented as a processor 130 itself. Software-wise, the example embodiments such as procedures and functions described in the present disclosure may be implemented as separate software modules. Each of the software modules may perform one or more function and operation described in the present disclosure.

Figure 11:
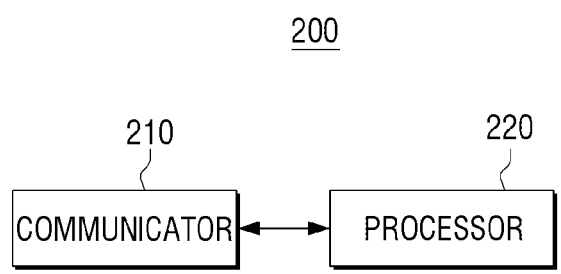
FIG. 11 is a block diagram illustrating an example server, according to an example embodiment.

FIG. 11 is a block diagram illustrating an example configuration of a server, according to an example embodiment.

Referring to FIG. 11, the server 200 includes a communicator (e.g., including communication circuitry) 210 and a processor (e.g., including processing circuitry) 220.

The communicator 210 may include various communication circuitry for communicating with various external apparatuses. The communicator 210 may include various communication circuitry, such as, for example, and without limitation, communication chips such as a Wi-Fi chip, a Bluetooth chip, a wireless communication chip, or the like. The Wi-Fi chip and the bluetooth chip communicate in a Wi-Fi method and a Bluetooth method, respectively. The wireless communication chip may refer, for example, to a chip that performs communication according to various communication standards such as institute of electrical and electronics engineers (IEEE), Zigbee, 3rd generation (3G), 3rd generation partnership project (3GPP), long term evolution (LTE), and so on. In addition, the communicator 110 may further include a near field communication (NFC) chip which is operated in an NFC method.

For example, the communicator 210 may receive characteristic information from the content processing apparatus 100, and transmit matching information, which is a response to the received characteristic information, to the content processing apparatus 100. In addition, the communicator 210 may receive content recognition information from the content processing apparatus 100.

The communicator 210 may communicate not only with the content processing apparatus 100 but also with various external apparatuses. For example, the server 200 may use various information received from various servers, such as, for example, and without limitation, an event server, advertisement server, capture server, EPG metadata server, or the like. The above case will be described in greater detail with reference to FIG. 12 below. In addition, the server 200 itself may be implemented as an apparatus which is capable of performing functions of various external apparatuses.

The processor 220 may include various processing circuitry as set forth above for controlling an overall operation of the server 200. For example, the processor 220 controls an overall operation of the server 200 using various programs stored in a storage (not shown) of the server 200. For example, the processor 220 may include various processing circuitry, such as, for example, a CPU, RAM, ROM and system bus. In this example, the ROM is a configuration in which a command set for system booting is stored, and the CPU copies an operating system (O/S) stored in the storage of the content processing apparatus 200 to the RAM, executes the O/S, and boots the system. When the booting is completed, the CPU may copy various applications stored in the storage into the RAM, and execute the applications copied into the RAM to perform various operations. It is described above that the processor 220 includes only one CPU; however, the processor 130 may be implemented as a plurality of CPU (or DSP, SoC, etc.).

For example, when the processor 220 retrieves a plurality of first characteristic information that are matched with first characteristic information received from the content processing apparatus 100, control the communicator 110 to transmit a plurality of matching information corresponding to each of the plurality of retrieved first characteristic information and a plurality of second characteristic information corresponding to each of the plurality of retrieved first characteristic information to the content processing apparatus 100.

In this example, if the first characteristic information is video characteristic information, the second characteristic information is audio characteristic information. If the first characteristic information is audio characteristic information, the second characteristic information is video characteristic information.

In this example, the matching information may include additional information, and the additional information may include at least one of: advertisement information related to the content, channel recommendation information and polling information. The server 200 may receive the advertisement information, channel recommendation information, polling information, etc. from various external servers, such as an advertisement information provision server, channel recommendation information provision server and polling information provision server, to provide the received information to the content processing apparatus 100.

Meanwhile, the processor 220 may, when receiving content recognition information from the content processing apparatus 100, perform retrieval within a search range corresponding to the received content recognition information with respect to first characteristic information received from the content processing apparatus after receiving the content recognition information.

For example, content currently being output from the content processing apparatus 100 may be recognized through the content recognition information. Accordingly, the server 200 may only have to retrieve characteristic information received from the content processing apparatus 100 after receiving the content recognition information within a search range of the recognized content without the need to perform retrieval with respect to the entire database.

According to the present example embodiment, a content recognition speed may be improved. In addition, a possibility of occurrence of multi-matching would be made lower.

However, to prevent the server 200 from retrieving characteristic information in the scope of content previously recognized even if content in the content processing apparatus 100 is changed, the content processing apparatus 100, when an event where content is changed occurs, immediately notifies the server 200 of the event.

Meanwhile, the processor 220 may, when one first characteristic information that is matched with first characteristic information received from the content processing apparatus 100 is retrieved, control the communicator 210 to transmit matching information corresponding to the one retrieved first characteristic information to a viewing data collection server. In addition, in the case where the above-mentioned content recognition information is received from the content processing apparatus 100, the processor 100 may control the communicator 210 to transmit the received content recognition information to the viewing data collection server.

According to the present example embodiment, a user of the content processing apparatus 100 may acquire viewing data with respect to content viewed, and such viewing data may be used for various purposes such as for advertisement, for providing user-customized content, for the purpose of public policy including media diversity determination.

Various example embodiments of the present disclosure may be implemented by a computer or a recording medium which is readable with an apparatus similar to the computer using software, hardware or a combination thereof. Hardware-wise, the embodiments described in the present disclosure may be implemented using various processing circuitry, such as, for example, and without limitation, at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors and an electrical unit for performing other functions. In some cases, the example embodiments in the present disclosure may be implemented as a processor 220 itself. Software-wise, the example embodiments such as procedures and functions described in the present disclosure may be implemented as separate software modules. Each of the software modules may perform one or more function and operation described in the present disclosure.

Although the above-described examples describe that the server 200 receives first characteristic information only, according to another example embodiment, the server 200 may receive both first characteristic information and second characteristic information to perform a content recognizing operation. An example embodiment is described in greater detail below with reference to FIG. 12.

Figure 12:
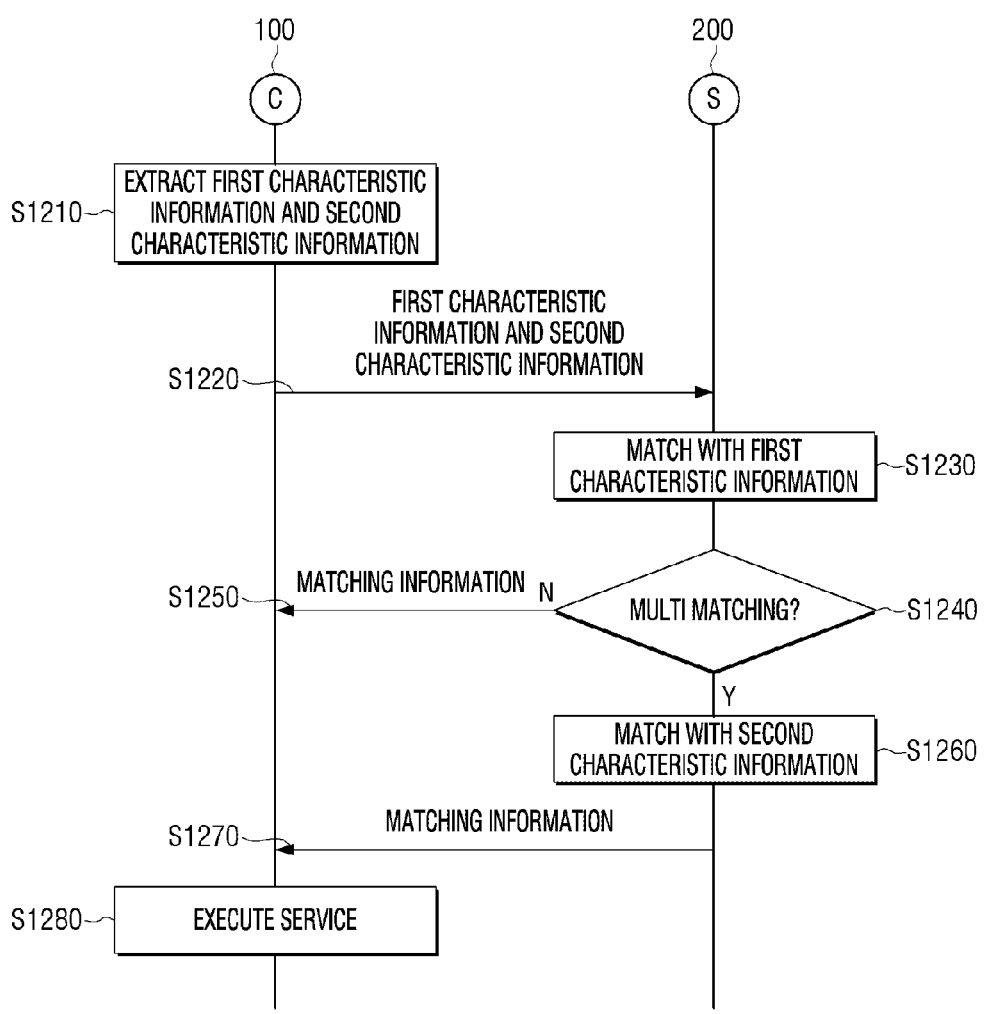
FIG. 12 is a sequence diagram illustrating example content recognition of a content processing apparatus and a server, according to another example embodiment.

FIG. 12 is a sequence diagram illustrating example communication between the content processing apparatus 100 and the server 200, according to another example embodiment.

Referring to FIG. 12, the content processing apparatus 100 extracts first characteristic information and second characteristic information from content being output, at step S1210.

The content processing apparatus 100 transmits the extracted first characteristic information and second characteristic information to the server 200, at step S1220.

The server 200 determines whether first characteristic information matched with the received first characteristic information is included in a database of the server 200, at step S1230. As a result of retrieval, when a plurality of first characteristic information are retrieved, for example, when determining that a multi-matching has occurred, at step S1240, the server 200 retrieves whether there is first characteristic information corresponding to second characteristic information that is matched with the second characteristic information from among the plurality of first characteristic information, at step S1260. For example, a retrieval result is filtered using the second characteristic information. Accordingly, since both audio characteristic information and video characteristic information are used to recognize content, content which is actually being output in the content processing apparatus 100 may be accurately recognized.

In addition, the server 200, when no multi-matching occurs and only one retrieval result is derived, transmits the retrieval result to the content processing apparatus 100 as matching information, at step S1250. In addition, the server transmits one matching information which is filtered after the occurrence of multi-matching to the content processing apparatus 100 as one matching information, at step S1270.

The content processing apparatus 100 executes service based on the received matching information, at step S1280.

For example, an execution of service may be execution of a service which outputs additional information included in matching information as illustrated in FIG. 7, or execution of a service which stores matching information as content recognition information and transmits the content recognition information to a viewing data collection server.

Figure 13:
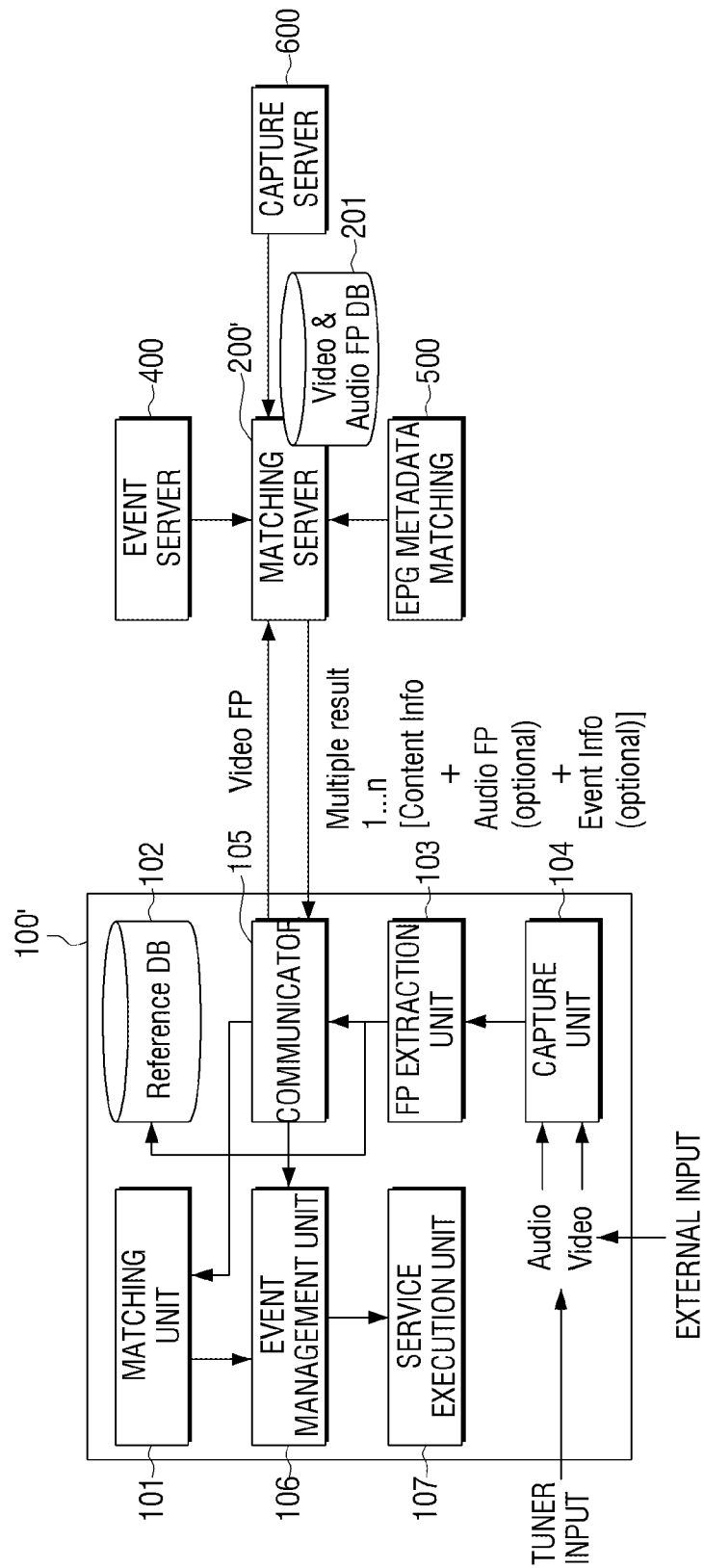
FIG. 13 is a diagram illustrating an example configuration of an information providing system, according to another example embodiment.

FIG. 13 is a diagram illustrating an example information provision system, according to another example embodiment. In the present example embodiment, a fingerprint is used as characteristic information.

Referring to FIG. 13, the information provision system includes a content processing apparatus 100', a matching server 200', an event server 400, an EPG metadata server 500 and a capture server 600.

The content processing apparatus 100' includes a capture unit 104 which captures audio or video from a multimedia content signal received from a tuner input or an external input, a fingerprint extraction unit 103 which extracts a fingerprint and a communicator (e.g., including communication circuitry) 105 which communicates with the matching server 200'.

The fingerprint extraction unit 103 simultaneously extracts a video fingerprint and an audio fingerprint when a fingerprint is extracted, and the extracted audio fingerprint is stored in a reference database 102.

The capture server is a server which extracts a fingerprint from content. For example, the capture server 600 may capture content of a live broadcast tuner bank or file/streaming to extract a fingerprint.

The EPG metadata server 500 is a server which provides EPG metadata information, and the event server 400 is a server which provides an event as to overlay or content interworking service. That is, the above-mentioned servers are servers which are capable of providing additional information as described above.

In addition, the matching server 200' is a server which groups information provided from the capture server 600, the EPG metadata server 500, the event server 400, etc. and stores the information, and when a fingerprint is transmitted from the content processing apparatus 100, finds a fingerprint that coincides with the transmitted fingerprint and provides content information.

The matching server 200' includes a database 201 which stores both an audio fingerprint and a video fingerprint. The matching server 200' may, when a multi-matching occurs during video matching using a video fingerprint, provide an audio fingerprint corresponding to a result of each of the multi-matching to the content processing apparatus 100'. For example, as illustrated in FIG. 13, each of the multi-matching results 1 to n includes content information.

In this example, the multi-matching results may or may not include event information or an audio fingerprint. For example, when the characteristics of audio is mute or not recognizable, the multi-matching result may not include an audio fingerprint and instead, may include a preset message indicating the audio fingerprint. Alternatively, EPG metadata may be provided to the content processing apparatus 100 instead of the audio fingerprint.

In addition, a single-matching result may not include an audio fingerprint.

The matching unit 101 of the content processing apparatus 100' may, when a multi-matching occurs, perform a function of local audio matching which compares audio fingerprints transmitted from the matching server 200' and an audio fingerprint previously stored in the reference database 102.

The event management unit 106 may transmit information for execution of an event to the service execution unit 107. For example, event information and information on a time when the event information is to be outputted may be transmitted. The service execution unit 107 may provide a service including displaying the event information together with the content, etc.

Meanwhile, if the content processing apparatus 100' is TV, the above-mentioned service may be executed in TV, but may also be executed in another apparatus connected to the content processing apparatus 100' via network, for example, a mobile apparatus such as a smartphone.

Figure 14:
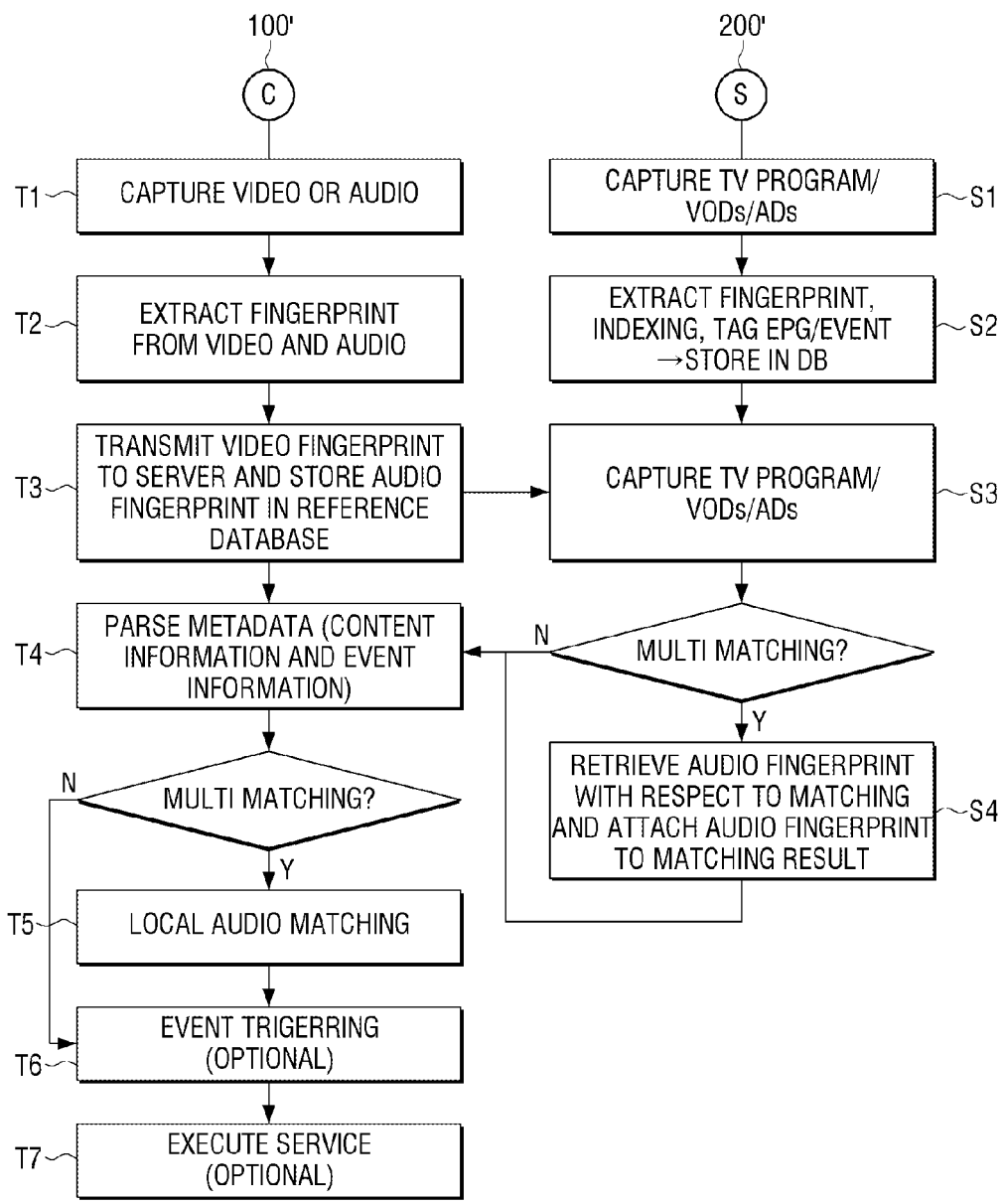
FIG. 14 is a flowchart illustrating an example content recognition method of an information providing system, according to an example embodiment.

FIG. 14 is a flowchart illustrating an example operation processing flow of the information provision system illustrated in FIG. 13.

Referring to FIG. 14, the matching server 200' does not extract a fingerprint of either one of audio or video from one or more content sources, but simultaneously extracts fingerprints from both the audio and video and stores the extracted fingerprints, at step S1. The above-mentioned fingerprints are tagged by information on content, at step S2. The content information is EPG metadata for each channel for a live broadcast, and is information on recorded content for content such as VoD/OTT or customized content.

In addition, the matching server 200', when a query using a video fingerprint is generated from the content processing apparatus 100', retrieves stored video fingerprints to find a fingerprint that matches, at step S3. However, when multiple fingerprints are multi-matched, the matching server 200' adds an audio fingerprint connected to a video fingerprint to a multi-matching result and transmits the result to the content processing apparatus, at step S4. In this example, a retrieving process may be performing fast searching with hash information by performing indexing, or may be retrieving a fingerprint itself.

Meanwhile, all multi-matching results may include an audio fingerprint, or only some of the multi-matching results may include the audio fingerprint.

Data transmitted to the content processing apparatus 100' may include link information (time or index) previously transmitted along with the video fingerprint from the content processing apparatus 100' together with the audio fingerprint.

Meanwhile, audio fingerprints transmitted to the content processing apparatus 100' may only include an audio fingerprint corresponding to a time or index of a video-matched video fingerprint, or may include an audio fingerprint corresponding to a time within a predetermined range of a time of the video fingerprint as well.

The content processing apparatus 100' captures video or audio, at step T1, and simultaneously extracts a fingerprint from the video and audio, at step T2. In addition, the content processing apparatus 100' transmits a video fingerprint to the matching server 200', and an audio fingerprint is stored in a reference database within the content processing apparatus 100', at step T3. Meanwhile, an audio fingerprint and a video fingerprint extracted in a same content scene are connected to each other through time information or link index, and the time information or the link index is transmitted to the matching server 200' and stored in the reference database within the content processing apparatus, at step T4.

The matching server 200' performs a server matching (video matching) with the video fingerprint received from the content processing apparatus 100', at step S3.

When a message transmitted from the server only has a result of single-matching, or has no audio fingerprint, the content processing apparatus 100' performs event-triggering, at step T6, to execute service, at step T7. For example, the content processing apparatus 100', when there is only one result, uses the received content information to provide the result to a service that needs it.

On the other hand, when multi-matching is performed and audio fingerprint is transmitted, the content processing apparatus 100' performs local audio matching which compares a plurality of transmitted audio fingerprints and audio fingerprints stored in the reference database, at step T5, and when there is a matching fingerprint, select the information as one matching information and uses content information and event information, at steps T6 and T7.

For reference, information selected by single-matching may transmitted to the viewing data collection server again according to circumstances.

Meanwhile, the steps T6 and T7 may occur or may not occur according to circumstances, and is not a mandatory process. For example, when there is no additional information to be output from the recognized content part, the step T6 or T7 may not occur.

As mentioned above, a hybrid matching method which simultaneously uses video matching and audio matching may allow local audio matching performed in the content according apparatus 100' to be stopped according to a selection made in the audio apparatus 100' or the matching server 200'.

The above-described example embodiments illustrate that video matching is performed in the matching server 200' and audio matching is performed in the content processing a 100'. However, it is also possible to realize such that audio matching is performed in the server 200' and video matching is performed in the content processing apparatus 100'. In this example, the content processing apparatus 100' transmits an audio fingerprint, not a video fingerprint, to the matching server 200'. In addition, the matching server 200' transmits content information or event information attached with a video fingerprint to the content processing apparatus 100'.

According to another example embodiment, it may be realized such that both audio matching and video matching are performed in the matching server 200'. In this example, the content processing apparatus 100' may transmit both the video fingerprint and the audio fingerprint to the matching server 200', and the matching server 200' may, while matching is performed with respect to any one of the received video fingerprint and audio fingerprint, for example, with respect to the video fingerprint, when multi-matching occurs, filter a result of multi-matching with the audio fingerprint to accurately recognize content. For example, it is also possible to realize that an multi-matching processing operation of a content processing apparatus described in the above-mentioned other example embodiments may be performed in the matching server 200'. In addition, the matching server 200' may transmit additional information corresponding to the recognized content, etc. to the content processing apparatus 100'.

Figure 15:
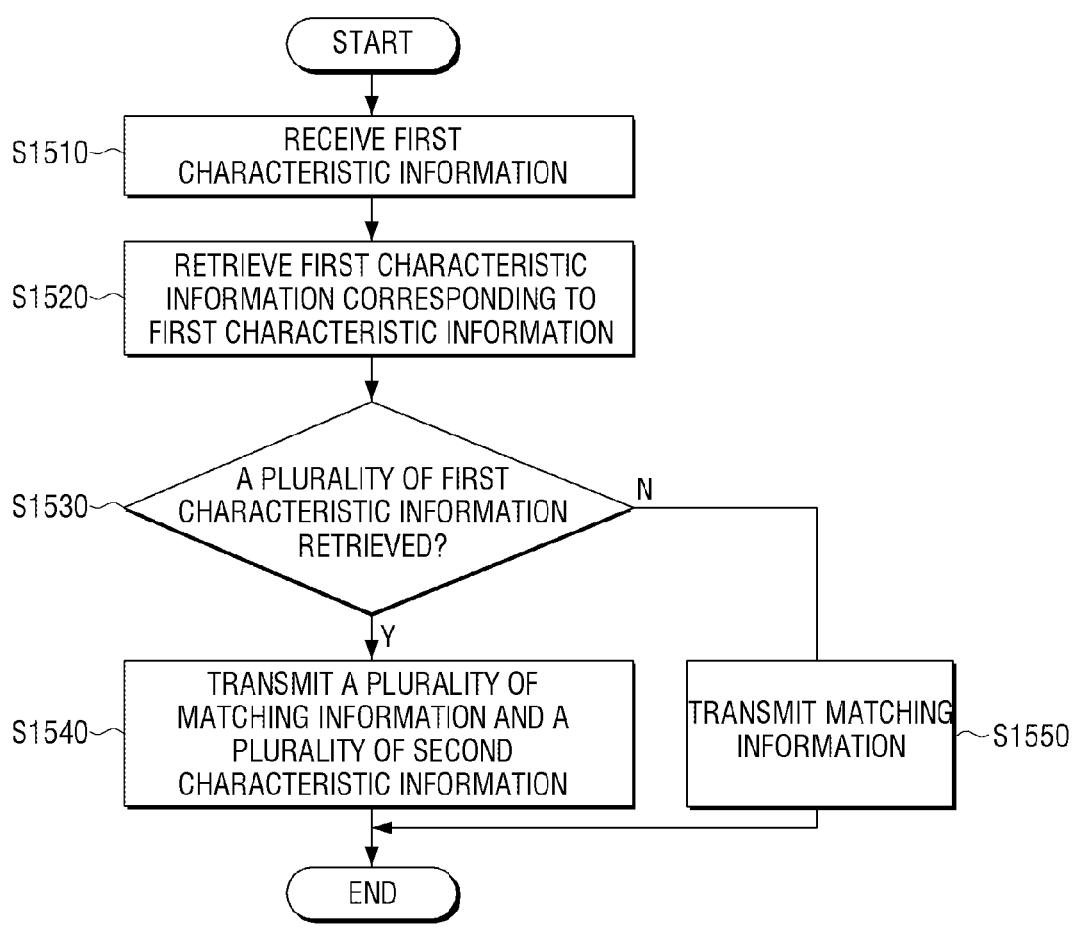
FIG. 15 is a flowchart illustrating an example information providing method of a server, according to an example embodiment.

FIG. 15 is a flowchart illustrating an example information providing method of a server, according to an example embodiment.

Referring to FIG. 15, the server receives first characteristic information from a content processing apparatus, at step S1510. In this example, the first characteristic information is video characteristic information or audio characteristic information.

In addition, the server retrieves first characteristic information that is matched with the received first characteristic information, at step S1520. For example, the server retrieves characteristic information that is matched with the first characteristic information from among characteristic information provided from a capture server (not shown).

In addition, the server determines whether a plurality of first characteristic information that are matched with the first characteristic information are retrieved, at step S1530, and when one first characteristic information is retrieved, transmits content information corresponding to the one characteristic information and/or one matching information including additional information, at step S1550.

When a plurality of first characteristic information are retrieved, the server transmits a plurality of matching information corresponding to each of the plurality of retrieved first characteristic information and a plurality of second characteristic information corresponding to the plurality of retrieved first characteristic information to the content processing apparatus, at step S1540. In this example, if the first characteristic information is video characteristic information, the second characteristic information is audio characteristic information. If the first characteristic information is audio characteristic information, the second characteristic information is video characteristic information.

According to the present disclosure, information matching schemes of both audio and video characteristics are used, thereby widening a recognizable area. In addition, an accuracy of viewing data collection may be improved and a scope of providing interworking service together with content may be also expanded.

Meanwhile, the methods according to the above various example embodiments may be generated to be software and loaded on an electronic apparatus.

For example, there may be provided a non-transitory computer readable medium storing a program which performs extracting first characteristic information and second characteristic information of a different type from the first characteristic information from content being outputted, transmitting the extracted first characteristic information to a server, and in response to receiving a plurality of matching information that corresponds to the transmitted first characteristic information, outputting matching information that corresponds to second characteristic information extracted from the content from among the plurality of matching information.

According to another example embodiment, there may be provided a non-transitory computer readable medium storing a program which performs receiving first characteristic information from a content processing apparatus, and in response to retrieving a plurality of first characteristic information matched with the received first characteristic information, transmitting a plurality of matching information corresponding to each of the plurality of retrieved first characteristic information and a plurality of second characteristic information corresponding to each of the plurality of first characteristic information to the content processing apparatus.

The non-transitory readable medium refers to a medium that is capable of storing data semi-permanently, and that is machine-readable. For example, the non-transitory readable medium may be CD, DVD, hard disk, Blu-ray disk, USB, memory card, ROM, etc.

While the present disclosure has been illustrated and described with reference to various example embodiments thereof, it will be understood by those skilled in the art that various changes in form and details may be made therein without departing from the spirit and scope of the present disclosure as defined by the appended claims and their equivalents.

What is claimed is:

1. A content processing apparatus, comprising:
output circuitry;
communication circuitry; and
a processor configured to extract, from the content, first characteristic information and second characteristic information, wherein the first characteristic information is one of video characteristic information and audio characteristic information and the second characteristic information is the other one of the video characteristic information and the audio characteristic information,
wherein the processor further is configured to:
control the communication circuitry to transmit the first characteristic information to a server;
based on receiving a plurality of characteristic information corresponding to contents matched to the transmitted first characteristic information and a plurality of additional information corresponding to the plurality of characteristic information, select one from among the plurality of characteristic information based on the second characteristic information extracted from the content; and
control the output circuitry to output additional information, from among the plurality of additional information, corresponding to the selected characteristic information.

2. The apparatus as claimed in claim 1,
wherein the plurality of additional information comprises at least one of: advertisement information, content recommendation information, polling information and URL information related to the content.

3. The apparatus as claimed in claim 1, wherein the processor is configured to extract the first characteristic information and the second characteristic information from content being currently output, in response to occurrence of a first event in which a preset time period starts, a second event in which a source which provides a content is changed, or a third event in which a channel is changed.

4. The apparatus as claimed in claim 1, wherein the processor is configured to control the communication circuitry to transmit, to the server, as content recognition information, additional information, from among the plurality of additional information, corresponding to the second characteristic information.

5. A server, comprising:
communication circuitry configured to receive, from a content processing apparatus, first characteristic information extracted from content output by the content processing apparatus; and
a processor configured to:
receive the first characteristic information, wherein the first characteristic information is one of video characteristic information and audio characteristic information;
retrieve a plurality of first characteristic information corresponding to contents matched to the first characteristic information and a plurality of additional information corresponding to the plurality of characteristic information;
control the communication circuitry to transmit, to the content processing apparatus, the plurality of characteristic information and the plurality of additional information corresponding to the plurality of characteristic information.

6. The server as claimed in claim 5,
wherein the plurality of additional information comprises at least one of: advertisement information, content recommendation information, polling information and URL information related to the content.

7. The server as claimed in claim 5, wherein the processor is configured to perform retrieving within a search range corresponding to received content recognition information, in response to receiving content recognition information from the content processing apparatus, with respect to first characteristic information received from the content processing apparatus after receiving the content recognition information.

8. The server as claimed in claim 5, wherein the processor is configured to control the communication circuitry to transmit, to a view data collection server, additional information corresponding to retrieved characteristic information, in response to retrieving one characteristic information matched with the received first characteristic information.

9. A content processing method, comprising:
   outputting content;
   extracting, from the content, first characteristic information and second characteristic information, wherein the first characteristic information is one of video characteristic information and audio characteristic information and the second characteristic information is the other one of the video characteristic information and the audio characteristic information;
   transmitting the extracted first characteristic information to a server;
   based on receiving a plurality of characteristic information corresponding to contents matched to the transmitted first characteristic information and a plurality of additional information corresponding to the plurality of characteristic information, selecting one from among the plurality of characteristic information based on the second characteristic information extracted from the content; and
   controlling output circuitry to output additional information, from among the plurality additional information, corresponding to the selected characteristic information.

10. The method as claimed in claim 9,
   wherein the plurality of additional information comprises at least one of: advertisement information, content recommendation information, polling information and URL information related to the content.

11. The method as claimed in claim 9, wherein the extracting comprises extracting the first characteristic information and the second characteristic information from content currently being output, in response to occurrence of a first event in which a preset time period starts, a second event in which a source which provides a content is changed, or a third event in which a channel is changed.

12. The method as claimed in claim 9, further comprising:
   transmitting, to the server, as content recognition information, additional information, from among the plurality of additional information, corresponding to the second characteristic information.

* * * * *